United States Patent Office 3,726,677
Patented Apr. 10, 1973

3,726,677

PHOTOPOLYMERISATION WITH LEUCO INDIGO DYE DERIVATIVES

Martin Hepher, Berkhampstead, and John Arthur Sperry, Chalfont St. Peter, England, assignors to Norprint Limited, Autotype Division, London, England No Drawing. Filed Feb. 19, 1971, Ser. No. 117,138
Claims priority, application Great Britain, Mar. 6, 1970, 10,884/70
Int. Cl. G03c 1/68, 1/70
U.S. Cl. 96—33 9 Claims

ABSTRACT OF THE DISCLOSURE

The polymerisation of unsaturated compounds caused by exposure to light of photosensitive systems is known and prior systems are discussed. The known sensitivity to light of leuco derivatives of indigoid dyes is employed to initiate the image-forming polymerisation of monomers. The invention provides a method of forming a polymeric resist image by the image-wise exposure of a base coated with a vinyl monomer dispersion containing a leuco sulphuric ester of an indigo or thio-indigo dye. The formation of etching resists, silk screen stencils and other image-bearing products is described.

The present invention relates to the catalytic photopolymerisation of polymerisable unsaturated organic compounds and is particularly concerned with improved photo-initiators and photopolymerisable systems containing them.

It is well known to form photopolymerised images by the light insolubilisation of an unsaturated compound in a suitable binder. In particular, water-soluble systems have been much sought after because of the ease of processing such systems. For example, known water-soluble systems which rely on photo-crosslinking of unsaturated compounds using photosensitive compounds such as silver salts and other metal salts, including ferric salts, are described in British patent specifications 858,037, 866,631, 867,980, 879,892, 885,128, 906,143 and 904,097.

It is desirable to avoid the use of silver compounds, because of their relatively high cost, and the most practical of these systems have been concerned with ferric salt sensitisation. Although ferric salt systems are capable of providing efficient photopolymerisation of unsaturated compounds, it is necessary for a per-compound, e.g. a peroxide, to be present in the system in order to provide a source of free radicals which initiate the photopolymerisation. If ferric salts are incorporated in a binder, such as gelatin, together with an ethylenically-unsaturated monomer, actinic irradiation and treatment with a peroxide, e.g. hydrogen peroxide, cause free radicals to be formed which initiate photopolymerisation of the monomer and so cause insolubilisation of the layer. However, it is known that photoinitiators of the ferric salt type, especially complex ferric salts of carboxylic acids, will cause photoinsolubilisation of a binder such as gelatine or polyvinyl alcohol without the presence of an unsaturated monomer. This is shown, for instance, by the reactions described in British Pat. 665,649, U.S. patent specification 2,927,021 and in an article by Fichter, Dickerson and Sprague; Photo. Sci. Eng. 1959, 3,299.

However, it is still necessary to treat the exposed layer with hydrogen peroxide to effect the photo-insolubilisation or to include in the layer a non-volatile per-compound such as cumene hydroperoxide. The former step is inconvenient, since it necessitates a chemical processing stage prior to washing away the unexposed parts of the coated layer, whilst the incorporation of a non-volatile per-compound in the layer leads to poor keeping qualities of the raw stock.

A different system has been widely investigated in which the photocatalysts are photo-reducible dyes, such as rose bengal, erythrozine, acriflavine and methylene blue. This is described by J. Kosar, Light-Sensitive Systems (John Wiley & Sons) pages 184–187. So far, these systems appear to have been of limited commercial practice and it appears that they are inhibited by the presence of oxygen and long or variable induction periods are therefore required before photopolymerisation of the monomer is achieved.

It has now been found that photopolymerisation of unsaturated monomeric compounds can be effectively carried out by using commercially-available compounds as photoinitiators in systems which provide the advantages of known water-soluble systems without the attendant defects and without having other disadvantages of the kinds mentioned. A system has now been developed based upon a reaction which is direct and it is unnecessary to employ a per-compound at any stage of the process, thereby greatly simplifying the handling of coated products. At the same time, the system is very efficient in that only a relatively short exposure-time under conventional illumination conditions is needed to provide a high degree of polymerisation. This is not the case with many of the previously disclosed photopolymerisation systems.

The present invention is based upon the discovery that certain derivations of the indigo and thio-indigo class of dyes can be used as initiators for effecting the photopolymerisation of vinyl monomers in aqueous solution or in coated dry layers in the presence of retained water.

According to one aspect of the present invention, a method is provided for producing a polymeric resist which comprises subjecting to imagewise exposure a light-sensitive material comprising a base coated with a vinyl monomer dispersed in a colloid or resin carrier and containing as the photoinitiator a leuco sulphuric ester of an indigo or thio-indigo dye.

The invention also provides a material for the production of polymeric resist images, consisting of a support carrying a coating comprising a vinyl monomer dispersed in a colloid or resin carrier and containing as the photoinitiator a leuco sulphuric ester of an indigo or thioindigo dye.

The invention further consists in a light-sensitive composition consisting essentially of a vinyl monomer together with a photopolymerisation initiator consisting of a leuco sulphuric ester of an indigo or thio-indigo dye and optionally containing (1) a colloid or resin carrier and (2) a humectant.

According to a preferred feature of the invention, the vinyl monomer is preferably one which contains at least two terminal vinyl groups, each linked to a carbon atom in a straight chain or ring.

The leuco sulphuric esters of the indigo or thio-indigo dyes were originally known as "indigosols" and are now usually referred to as "solubilised indigoid vat colours"; they are marketed in the form of their sodium salts under the names "Indigosols" (Durand & Hugenin), "Anthrasols" (Farbwerke Hoechst, A.G.), "Soledons" (I.C.I.) and several others. These indigosols may be used individually or in mixtures in carrying out the invention. Examples of especially suitable dyes are:

Anthrasol Orange HR
Anthrasol Blue-Black IRD
Anthrasol Scarlet IB
Anthrasol Pink IR Extra The light sensitivity of these compounds is well known and they have been used in a number of photo-print-out systems to form visible dye images, such as are described in British patent specifications 345,575, 417,588, 431,072, 523,296, 597,982, 633,634 and 1,083,436. However, it has not previously been proposed that these compounds have utility for the photopolymerisation of monomers and the production of images by this means.

The vinyl monomer component can be any material which is water-soluble or water-miscible and is terminally ethylenically unsaturated at least at one point in the molecule, i.e. it contains at least one non-aromatic double-bond between adjacent carbon atoms. Among many suitable vinyl monomers are acrylamide and methacrylamide. In order to make the process more efficient, it is desirable that the photopolymerised areas should be made as insoluble as possible in the shortest possible time, i.e. using the shortest exposure, and this depends upon the degree of cross-linking which occurs during the polymerisation. Of particular use in this respect are unsaturated compounds which, as already indicated, contain at least two terminal vinyl groups. Among such cross-linking monomeric agents are N,N-methylene-diacrylamide, trimethylene-diacrylamide and hexamethylene-diacrylamide; (these compounds are sometimes referred to as "bisacrylamides" instead of as "diacrylamides" and either name may be used). These compounds may be used alone or in admixture; generally speaking, increasing the quantity of cross-linking agent increases the hardness of the polymer obtained.

Water is a necessary component of the reaction mixture and must be present for the photopolymerisation, though operable products can be dry in practice, by containing the water necessary for reaction in some absorbed or combined form. In the case of some colloid carriers, sufficient water may be retained in the dried coating, but generally it is advantageous to add a small proportion of a humectant. Suitable humectants, i.e. hygroscopic substances, include polyhydric alcohols, e.g. glycerol, glycol and glycol derivatives, and inorganic substances providing they do not form water-insoluble salts with the leuco dye or suppress the solubility of the dye.

Suitable water-soluble colloid carriers include polyvinyl alcohol, gelatine, casein, hydroxyethyl celluose, hydroxypropylcellulose and polyvinyl pyrrolidone. Such colloid carriers are not insolubilised by the above photocatalysts in the absence of vinyl monomers.

There may also be included in the coated material pigments, to render the final image visible, and also fillers such as silica, kaolin or titanium dioxide which may be used to prevent the coating becoming moist and sticky.

The actinic radiation, either for polymerisation in aqueous solution or imagewise polymerisation, may be natural or light derived from a carbon arc lamp, a xenon arc lamp, a high-intensity mercury lamp or from tungsten filament light sources.

Numerous materials are suitable for supports for the photosensitive coating described above, such as paper, glass, metal and plastics sheeting. To obtain good adhesion of the photopolymerisable image, it is generally preferred that the surface of the support is at least partly hydrophilic. If necessary, this property can be obtained by treating or coating the support surface with a suitable substance prior to the application of the photosensitive layer. Apart from the materials already mentioned, the support can be a porous material, such as woven fabric, or metal, or an open structure paper of the type known as Yoshino paper.

The images formed by photopolymerisation using the systems described can be used in any photographic or photomechanical process where resist or stencil or relief images are required, for example, etching resists for printing plates, name plates, dials, circuit patterns, etc., ink accepting images for lithographic masters or negative stencils for positive reversal litho systems. It is also envisaged to use the system for preparing stencils for silk screen printing, either by the direct or indirect methods and images can also serve as dye resists or printing matrices as well as visually coloured displays in reflective or transparent form. These examples are not, however, considered to be limited in any way with respect to the application of the invention.

The initial coating can be coloured to provide visible images, or the photopolymerised layer can be treated with a colouring solution after processing.

The suitability of the image so formed for a specific application is conditioned by the choice of colloid binder and/or the unsaturated monomer component.

The following examples illustrate some of the ways in which the materials and process of the invention can be employed. To those skilled in the art, it will be evident that the process could be applied to any image-forming system which is dependent on differential insolubilisation of a colloid or resin layer.

EXAMPLE 1

The following solution was coated on to pre-subbed polyester photographic film base (S41 obtainable from Bexford Ltd.):

| | Gms. |
|---|---|
| 15% gelatine solution, pigmented with Irgalite[1] Blue GLS | 20 |
| Acrylamide | 2.0 |
| N,N-methylenebisacrylamide | 0.2 |
| Anthrasol[2] Orange HR | 0.2 |
| Diethyleneglycol | 0.5 |

[1] Irgalite is the Registered Trademark for pigments supplied by Geigy (U.K.) Ltd.
[2] Anthrasol is the Registered Trademark of Farbwerke Hoechst A.G.

The coating was dried and exposed through a photographic positive to be 125-watt Phillips Reprolamp (MBR/U) at a distance of 14 inches for 90 seconds. After washing in warm (40° C.) water, a pigmented relief image was obtained.

When unsaturated monomer is excluded from the system, no insolubilisation or hardening of the colloid binder occurs; a solution similar to the above but omitting the mixed vinyl monomers, is, for example:

| | Gms. |
|---|---|
| 15% gelatine solution, pigmented with Irgalite Blue GLS | 20 |
| Anthrasol[1] Orange HR | 0.6 |
| Diethyleneglycol | 0.6 |

[1] Same as footnote 2 of this example.

The coating was dried and exposed through a photographic positive to a Phillips 125-watt Reprolamp (MBR/U) at a distance of 14 inches for 10 minutes. On washing with warm water (40° C.), the whole of the coated layer was removed. This latter example indicates that no insolubilisation of the layer occurs in the absence of an unsaturated monomeric compound.

EXAMPLE 2

The following mixture was coated on to pre-subbed photographic film base (Bexford S41):

| | Gms. |
|---|---|
| 12% aqueous solution of polyvinyl alcohol (Gohsenol GH23[1] | 20 |
| Acrylamide | 2.0 |
| N,N-methylenebisacrylamide | 0.2 |
| Anthrasol[2] Pink IR extra | 0.5 |
| Diethyleneglycol | 0.5 |

[1] Gohsenol is the Registered Trademark for polyvinyl alcohols supplied by Nippon Gohsei.
[2] Same as footnote 2 of Example 1.

The coating was dried in warm air and exposed through a photographic positive to a 125-watt Phillips Reprolamp (MBR/U) at a distance of 14 inches for 90 seconds. After washing in cold water, the almost colourless resist image could be discerned. This was dyed a strong blue colour and made clearly visible by immersion in a 2% aqueous solution of methylene blue dye for a few seconds, followed by washing with water.

EXAMPLE 3

The following mixture was coated on to photographic film base (Bexford S41):

| | Gms. |
|---|---|
| 12% aqueous solution of polyvinyl alcohol (Gohsenol GH23 [1]) pigmented with Irgalite [2] GLSOO | 20 |
| Trimethylene-diacrylamide | 0.15 |
| Anthrasol [3] Pink IR extra | 0.15 |
| Diethylene glycol | 0.5 |

[1] Same as footnote 1 of Example 2.
[2] Same as footnote 1 of Example 1.
[3] Same as footnote 2 of Example 1.

The coating was dried with warm air and exposed through a photographic positive to a 125-watt Phillips Reprolamp (MBR/U) at a distance of 14 inches for 1 minute. After washing in cold water to remove the unexposed coating, a pigmented relief image was obtained.

EXAMPLE 4

The following mixture was coated on to photographic film base (Bexford S41):

| | Gms. |
|---|---|
| 12% aqueous solution of polyvinyl alcohol (Gohsenol GH23 [1]) pigmented with Iragalite [2] GLSO | 20 |
| Hexamethylene-bisacrylamide | 0.15 |
| Anthrasol Grey IBL | 0.2 |
| Glycerol | 1.5 |

[1] Same as footnote 1 of Example 2.
[2] Same as footnote 1 of Example 1.

The coating was dried with warm air and exposed through a photographic positive to a 125-watt Phillips Reprolamp (MBR/U) at a distance of 14 inches for 1 minute. After washing in cold water to remove the unexposed coating, a pigmented relief image was obtained.

EXAMPLE 5

A frame stretched with nylon screen printing fabric (180 threads per inch) was coated with the following solution:

| | Gms. |
|---|---|
| Polyvinyl alcohol 88% hydrolysed (Gohsenol [1] GH23) | 10 |
| Anthrasol [2] Blue Black IRD | 0.8 |
| Acrylamide | 1.0 |
| N,N-methylenebisacrylamide | 0.8 |
| Glycerol | 4.0 |
| Silica (Aerosil 600 TT—Degussa) | 2.0 |
| Water | 100 |

[1] Same as footnote 1 of Example 2.
[2] Same as footnote 2 of Example 1.

After drying, the screen was exposed in contact with a positive line transparency for 2 minutes to two mercury vapour lamps (Phillips Reprolamp, 125-watt) at a distance of 24 inches. The screen was then washed in cold water to remove the unexposed coating and the resulting negative stencil dried off to provide a master for screen process printing.

EXAMPLE 6

A mechanically roughened and anodised aluminium plate was coated with the following solution:

| | Gms. |
|---|---|
| Polyvinyl alcohol 88% hydrolysed (Gohsenol [1] GH23) | 10 |
| Anthrasol [2] Blue Black IRD | 0.8 |
| N,N-methylenebisacrylamide | 4.0 |
| Water | 200 |

[1] Same as footnote 1 of Example 2.
[2] Same as footnote 2 of Example 1.

This was applied by a litho plate whirler rotating at approximately 100 r.p.m. and the coating dried with gentle heat. The coated plate was then exposed beneath a positive line transparency for 1 minute to two mercury vapour lamps (Phillips Reprolamp, 125-watt) placed at 24 inches from the plate. After exposure, the plate was washed in cold water to remove the unexposed coating and a negative stencil remained which was dried off.

The uncovered aluminium was then etched slightly by wiping it with following solution for about 1 minute:

| | Gms. |
|---|---|
| Calcium chloride | 37 |
| Hydrochloric acid | 1.5 |
| Cupric chloride | 0.5 |
| Nitric acid | 0.6 |
| Ferric chloride | 8 |
| Water | 100 |

The plate was then thoroughly washed and dried again with hot air. A lithographic base lacquer [1] was then wiped over the surface and the excess removed. This was followed by the application of a greasy lithographic ink. Finally the negative stencil image was removed by soaking the plate for a few minutes in dilute sodium hypochloride solution. This left a positive image consisting of lacquer and ink firmly adhering to the aluminium surface, thus providing a lithographic printing plate.

We claim:

1. A method of production of a polymeric resist image, which comprises; (a) providing a light-sensitive material consisting of a base carrying a light-sensitive coating free from per-compounds, such coating including a vinyl monomer dispersed in a carrier selected from the group consisting of colloid carriers and resin carriers, the vinyl monomer coating also containing water in a free or absorbed or combined form and further containing a photo-initiator consisting of a leuco sulfuric ester of a dye selected from the group consisting of indigo and thio-indigo dyes, and (b) subjecting such coated base to imagewise exposure to actinic radiation, whereby the photo-initiator undergoes a light-induced reaction and thereby initiates polymerisation of the vinyl monomer so as to produce a polymeric resist in the form of a photochemically-formed image.

2. A method of production of a polymeric resist image, which comprises; (a) providing a light-sensitive material consisting of a base carrying a light-sensitive coating free from per-compounds, such coating including a vinyl monomer selected from the group consisting of acrylamide and methacrylamide dispersed in a carrier selected from the group consisting of colloid carriers and resin carriers, the vinyl monomer coating also containing water in a free or absorbed or combined form and further containing a photo-initiator consisting of a leuco sulfuric ester of a dye selected from the group consisting of indigo and thio-indigo dyes, and (b) subjecting such coated base to imagewise exposure to actinic radiation, whereby the photo-initiator undergoes a light induced reaction and thereby initiates polymerisation of the vinyl monomer so as to produce a polymeric resist in the form of a photochemically-formed image.

3. A method of production of a polymeric resist image, which comprises; (a) providing a light-sensitive material consisting of a base carrying a light-sensitive coating free from per-compounds, such coating including a vinyl monomer selected from the group consisting of N,N-methylene-diacrylamide, trimethylene-diacrylamide and hexamethylene-diacrylamide dispersed in a carrier selected from the group consisting of colloid carriers and resin carriers, the vinyl monomer coating also containing water in a free or absorbed or combined form and further containing a photo-initiator consisting of a leuco sulfuric ester of a dye selected from the group consisting

[1] The lithographic base lacquer is that normally used in the art, e.g. a copolymer of vinyl acetate, vinyl chloride and maleic acid dissolved in a suitable solvent.

of indigo and thio-indigo dyes, and (b) subjecting such coated base to imagewise exposure to actinic radiation, whereby the photo-initiator undergoes a light-induced reaction and thereby initiates polymerisation of the vinyl monomer so as to produce a polymeric resist in the form of a photochemically-formed image.

4. A light-sensitive composition for use in the production of polymeric resist images by imagewise exposure of such composition, which consists essentially of; (a) a vinyl monomer, (b) water in a free or absorbed or combined form, and (c) a photoinitiator for the vinyl monomer comprising a leuco sulfuric ester of a dye selected from the group consisting of indigo and thio-indigo dyes.

5. A light-sensitive composition for use in the production of polymeric resist images by imagewise exposure of such composition, which consists essentially of (a) a vinyl monomer, (b) a carrier selected from the group consisting of polyvinyl alcohol, gelatine, casein, hydroxyethyl cellulose, hydropropyl cellulose and polyvinyl pyrroidone, (c) water in a free or absorbed or combined form, (d) a photo-initiator comprising a leuco sulfuric ester of a dye selected from the group consisting of indigo and thio-indigo dyes, and a humectant selected from the group consisting of polyhydric alcohols and inorganic substances which do not form water-insoluble salts with the photo-initiator incorporated in the composition for initiating polymerisation of the vinyl monomer.

6. A light-sensitive composition as set forth in claim 5, wherein the photoinitiator is selected from the group consisting of Anthrasol Orange HR, Anthrasol Blue-Black IRD, Anthrasol Scarlet IB, Anthrasol Pink IR Extra and Anthrasol Grey IBL.

7. A light-sensitive composition for use in the production of polymeric resist images by imagewise exposure of such composition, which consists essentially of; (a) a vinyl monomer, selected from the group consisting of acrylamide, methacrylamide, N,N-methylene-diacrylamide, trimethylene diacrylamide and hexa-methylene-diacrylamide, (b) water in a free or absorbed or combined form, (c) a humectant, (d) a carrier selected from colloid carriers and resin carriers, and (e) a photo-initiator for the vinyl monomer of said group, the photo-initiator consisting of a leuco sulfuric ester of an indigo or thioindigo dye selected from the group consisting of Anthrasol Orange HR, Anthrasol Blue-Black IRD, Anthrasol Scarlet IB, Anthrasol Pink IR Extra and Anthrasol Grey IBL.

8. A sheet material for use in the production of a polymeric resist image by imagewise exposure, which comprises a sheet-like base support carrying upon a surface thereof a light-sensitive coating of a composition consisting essentially of (a) a vinyl monomer, (b) water in a free or absorbed or combined form, and (c) a photoinitiator for the vinyl monomer comprising a leuco sulfuric ester of a dye selected from the group consisting of indigo and thio-indigo dyes.

9. A sheet material for use in the production of a polymeric resist image by imagewise exposure, which comprises a sheet-like base support carrying upon a surface thereof a light-sensitive coating of a composition consisting essentially of (a) a vinyl monomer, selected from the group consisting of acrylamide, methacrylamide, and hexamethylene-diacrylamide (b) water in a free or absorbed or combined form (c) a humectant, (d) a carrier selected from colloid carriers and resin carriers, and (e) a photoinitiator for the vinyl monomer of said group, the photo-initiator consisting of a leuco sulfuric ester of an indigo or thio-indigo dye selected from the group consisting of Anthrasol Orange HR, Anthrasol Blue-Black IRD, Anthrasol Scarlet IB, Anthrasol Pink IR Extra and Anthrasol Grey IBL.

References Cited

UNITED STATES PATENTS

| | | | |
|---|---|---|---|
| 3,625,696 | 12/1971 | Krauch et al. | 96—86 P |
| 3,637,382 | 1/1972 | Krauch | 96—35.1 |
| 2,875,047 | 2/1959 | Oster | 96—115 P |

FOREIGN PATENTS

| | | | |
|---|---|---|---|
| 756,547 | 4/1967 | Canada | 96—115 R |

RONALD H. SMITH, Primary Examiner

U.S. Cl. X.R.

96—35.1, 115 P; 204—159.24